:unsupported-content-for-brevity:

CEMENT COMPOSITIONS COMPRISING ENVIRONMENTALLY COMPATIBLE DEFOAMERS AND METHODS OF USE

CROSS-REFERENCE TO RELATED APPLICATION

This application is a divisional patent application of commonly-owned U.S. patent application Ser. No. 10/924,453, filed Aug. 24, 2004, now U.S. Pat. No. 7,150,322 entitled "Cement Compositions Comprising Environmentally Compatible Defoamers And Methods of Use," by Michael Szymanski, et al., which is incorporated by reference herein for all purposes.

BACKGROUND OF THE INVENTION

The present invention relates to cementing operations, and more particularly, to cement compositions comprising environmentally compatible defoamers and methods of using such cement compositions.

Hydraulic cement compositions commonly are utilized in subterranean operations, particularly subterranean well completion and remedial operations. For example, hydraulic cement compositions may be used in primary cementing operations, whereby pipe strings such as casings and liners are cemented in well bores. In performing primary cementing, hydraulic cement compositions may be pumped into an annular space between the walls of a well bore and the exterior surface of a pipe string disposed therein. The cement composition is permitted to set in the annular space, thereby forming therein an annular sheath of hardened substantially impermeable cement that substantially supports and positions the pipe string in the well bore, and bonds the exterior surface of the pipe string to the walls of the well bore. Hydraulic cement compositions also are used in remedial cementing operations that involve plugging highly permeable zones or fractures in well bores, plugging cracks and holes in pipe strings, and the like.

Hydraulic cement compositions often comprise defoaming compositions, or "defoamers." Defoamers commonly are utilized, for example, as components in well treatment fluids to prevent the formation of foam or the entrainment of gas during the preparation and placement of the well treatment fluid in the subterranean formation. Defoamers also have been utilized for "breaking" foamed fluids. For example, when an operator desires to dispose of a foamed well treatment fluid aboveground, the operator may add a defoamer to the well treatment fluid to break the foam, and thereby facilitate disposal of the well treatment fluid. Defoamers often are included in cement compositions, inter alia, to ensure proper mixing and to provide adequate control over the density of the cement composition.

A variety of defoamers are well known in the art, some of which may have undesirable environmental characteristics and/or may be limited by strict environmental regulations in certain areas of the world. Furthermore, many defoamers that comply with these strict environmental regulations may be relatively expensive and/or may suffer from other drawbacks, such as poorer defoaming performance.

SUMMARY OF THE INVENTION

The present invention relates to subterranean cementing operations, and more particularly, to cement compositions comprising environmentally compatible defoamers and methods of using such cement compositions in subterranean formations.

An example of a method of the present invention is a method of reducing foam generation in a cement composition, comprising adding a defoamer to a cement composition, the defoamer comprising a defoaming hydrocarbon base fluid and a non-ionic surfactant.

An example of a composition of the present invention is a defoamer, comprising a defoaming hydrocarbon base fluid, a non-ionic surfactant, and a hydrophobic particle.

Another example of a composition of the present invention is a cement composition comprising water, hydraulic cement, and a defoamer, the defoamer comprising a defoaming hydrocarbon base fluid and a non-ionic surfactant.

The features and advantages of the present invention will be readily apparent to those skilled in the art upon a reading of the description of the preferred embodiments that follows.

DESCRIPTION OF PREFERRED EMBODIMENTS

The present invention relates to subterranean cementing operations, and more particularly, to cement compositions comprising environmentally compatible defoamers and methods of using such cement compositions in subterranean formations.

The cement compositions of the present invention generally comprise water, a hydraulic cement, and an environmentally compatible defoamer of the present invention. Generally, the environmentally compatible defoamers of the present invention comprise at least one of a defoaming hydrocarbon base fluid, a surfactant, hydrophobic particles, or a mixture thereof. Any one of the components may be used independently as an environmentally compatible defoamer of the present invention. In certain embodiments wherein the defoaming hydrocarbon base fluid, surfactant, and hydrophobic particles are combined, the combination may offer further improvement in defoaming performance and/or greater cost efficiency, as well as improved compliance with some environmental regulations.

The water utilized in the cement compositions of the present invention may be fresh water, salt water (e.g., water containing one or more salts dissolved therein), brine (e.g., saturated salt water), or seawater. Generally, the water may be from any source provided that it does not contain an excess of compounds that may adversely affect other components in the cement composition. Further, the water may be present in an amount sufficient to form a pumpable slurry. In certain embodiments, the water may be present in the cement compositions of the present invention in an amount in the range of from about 16% to about 200% by weight of the cement ("bwoc") therein. In certain embodiments, the water may be present in the cement compositions of the present invention in an amount in the range of from about 40% to about 90% bwoc therein. In certain embodiments, the water may be present in the cement compositions of the present invention in an amount in the range of from about 40% to about 50% bwoc therein. One of ordinary skill in the art, with the benefit of this disclosure, will recognize the appropriate amount of water for a chosen application.

Any cements suitable for use in subterranean applications may be suitable for use in the present invention. In certain embodiments, the cement compositions of the present invention comprise a hydraulic cement. A variety of hydraulic cements may be suitable for use, including those comprising calcium, aluminum, silicon, oxygen, and/or sulfur, which may set and harden by reaction with water. Such hydraulic cements include, but are not limited to, Portland cements, pozzolanic cements, gypsum cements, soil cements, calcium phosphate cements, high alumina content cements, silica cements, high alkalinity cements, and mixtures thereof.

The cement compositions of the present invention also include an environmentally compatible defoamer of the present invention that comprises at least one of a defoaming hydrocarbon base fluid, a surfactant, hydrophobic particles, or a mixture thereof. Generally, the environmentally compatible defoamers of the present invention may be added at any time during the cementing process, such as whenever the appearance of foam is detected. In certain embodiments, the environmentally compatible defoamers of the present invention may be added to the water component of the cement composition before the addition of the hydraulic cement or any other selected additives. Generally, the environmentally compatible defoamers of the present invention may be present in the cement compositions of the present invention in an amount that achieves a desired defoaming effect. In certain embodiments, the environmentally compatible defoamers of the present invention may be present in the cement compositions in an amount in the range of from about 0.01% to about 5% bwoc. In certain embodiments, the environmentally compatible defoamers of the present invention may be present in the cement compositions in an amount in the range of from about 0.01% to about 2% bwoc. In certain embodiments, the environmentally compatible defoamers of the present invention may be present in the cement compositions in an amount in the range of from about 0.25% to about 0.75% bwoc.

A number of defoaming hydrocarbon base fluids may be used in the environmentally compatible defoamers of the present invention. In certain embodiments, the defoaming hydrocarbon base fluid may be a hydrocarbon that comprises an internal olefin. In certain embodiments, the defoaming hydrocarbon base fluids may comprise straight-chain n-alcohols, such as 1-butanol, 1-hexanol, 1-octanol, and 1-decanol. In certain embodiments, the straight-chain n-alcohols include those having between four and ten carbons. Other simple alcohols, such as 2-butanol, also may be used as a defoaming hydrocarbon base fluid in the environmentally compatible defoamers of the present invention. Optionally, the defoaming hydrocarbon base fluid also may be used in conjunction with a co-solvent, inter alia, to provide a more desirable flash point. Suitable co-solvents include, but are not limited to, ethylene glycol and propylene glycol. Other suitable co-solvents include ester-based fluids, such as "PETROFREE™ LV," available from Halliburton Energy Services, Inc., of Dallas, Tex. "PETROFREE™ LV" comprises an ester of 2-ethylhexanol and a plurality of monocarboxylic acids each comprising from about 6 to about 11 carbon atoms. Where a defoaming hydrocarbon base fluid is used in the environmentally compatible defoamers of the present invention, the defoaming hydrocarbon base fluid may be present in the environmentally compatible defoamer in an amount in the range of from about 0.01% to about 100% by weight of the environmentally compatible defoamer. In certain embodiments, the defoaming hydrocarbon base fluid may be present in an amount in the range of from about 40% to about 80% by weight of the environmentally compatible defoamer. In certain embodiments wherein a co-solvent is present, the co-solvent may be present in an amount in the range of from about 20% to about 50% by weight of the environmentally compatible defoamer.

Surfactants suitable for use in the environmentally compatible defoamers of the present invention generally are non-ionic and generally have low hydrophile-lipophile balance ("HLB") values. Suitable commercially available surfactants include, but are not limited to, "ENVIROGEM® AE01," "ENVIROGEM® AE02," and "ENVIROGEM® AE03," available from Air Products and Chemicals, Inc., of Allentown, Pa., and "RHODOCLEAN® HP," available from Rhodia Inc. of Cranbury, N.J. When present in the environmentally compatible defoamer, the surfactant may be present in the range of from about 0.01% to about 100% by weight of the environmentally compatible defoamer. In certain embodiments, the surfactant may be present in the environmentally compatible defoamer in an amount in the range of from about 1% to about 10% by weight of the environmentally compatible defoamer.

Hydrophobic particles suitable for use in the environmentally compatible defoamers of the present invention include, but are not limited to, graphite, aluminum stearate, hydrophobically-modified silica, and hydrophobically-modified clay. Commercially available examples of hydrophobic particles that may be suitable include, but are not limited to, those that are commercially available from Southern Clay under the trade names "CLAYTONE" and "CLOISITE." Where included in the environmentally compatible defoamers of the present invention, the hydrophobic particles may be present in an amount in the range of from about 0.01% to about 100% by weight of the environmentally compatible defoamer. In certain embodiments, the hydrophobic particles may be present in an amount in the range of from about 1% to about 20% by weight of the environmentally compatible defoamer. In certain embodiments, the hydrophobic particles may have a size in the range of from about 0.1 to about 50 micrometers. In certain embodiments, the hydrophobic particles may have a size that may be smaller than about 0.1 micrometers, or that may be greater than about 50 micrometers.

In certain embodiments, the environmentally compatible defoamers of the present invention comprise: 1-octanol; and a surfactant selected from the group consisting of ENVIROGEM® AE01 and AE02; wherein the surfactant is present in the environmentally compatible defoamer in an amount in the range of from about 1% to about 30% by weight of the defoamer. In certain embodiments, the environmentally compatible defoamers of the present invention comprise: a mixture of 1-octanol and a co-solvent; and a surfactant selected from the group consisting of ENVIROGEM® AE01 and AE02; wherein the co-solvent is present in the mixture of 1-octanol and co-solvent in an amount in the range of from about 10% to about 50% by weight; and wherein the surfactant is present in the environmentally compatible defoamer in an amount in the range of from about 1% to about 30% by weight of the environmentally compatible defoamer. In certain embodiments, the environmentally compatible defoamers of the present invention comprise: 1-hexanol; and a surfactant selected from the group consisting of ENVIROGEM® AE01 and AE02; wherein the surfactant is present in the environmentally compatible defoamer in an amount in the range of from about 1% to about 30% by weight of the environmentally compatible defoamer. In certain embodiments, the environmentally compatible defoamers of the present invention comprise: a mixture of 1-hexanol and a co-solvent selected from the group consisting of ethylene glycol and PETROFREE™ LV; and a surfactant selected from the group consisting of ENVIROGEM® AE01 and AE02; wherein the surfactant is present in the environmentally compatible defoamer in an amount in the range of from about 1% to about 30% by weight of the environmentally compatible defoamer; and wherein the 1-hexanol and the co-solvent are present in the mixture in a mass ratio ranging from about 4:1 to about 1:9, wherein the first number denotes 1-hexanol and the second number denotes the co-solvent. In certain embodiments, the environmentally compatible defoamers of the present invention comprise: a mixture of 1-hexanol and a co-solvent selected from the group consisting of ethylene glycol and PETROFREE™ LV; a surfactant selected from the group consisting of ENVIROGEM® AE01 and AE02; and hydrophobically-modified silica; wherein the hydrophobically-modified silica is present in an amount in the range of from about 10% to about 20% by weight of the environmentally compatible defoamer; wherein the surfactant is present in the environmentally compatible defoamer in an amount in the range of from about 1% to about 30% by weight of the environmentally compatible defoamer; and wherein the 1-hexanol and the co-solvent are present in the mixture in a mass ratio ranging from about 4:1 to about 1:9, wherein the first number denotes 1-hexanol and the second number denotes the co-solvent. In certain embodiments, the environmentally compatible defoamers of the present invention comprise: 1-butanol; a hydrophobic particle selected from the group consisting of graphite, hydrophobically-modified silica, and aluminum stearate; and a surfactant selected from the group consisting of ENVIROGEM® AE01 and AE02; wherein the surfactant is present in the environmentally compatible defoamer in an amount in the range of from about 1% to about 30% by weight; and wherein the hydrophobic particle is present in the environmentally compatible defoamer in an amount in the range of from about 10% to about 20% by weight. In certain embodiments, the environmentally compatible defoamers of the present invention comprise: an internal olefin; a hydrophobic particle selected from the group consisting of graphite, hydrophobically-modified silica, and aluminum stearate; and a surfactant selected from the group consisting of ENVIROGEM® AE01 and AE02; wherein the surfactant is present in the environmentally compatible defoamer in the range of from about 10% to about 30% by weight; and wherein the hydrophobic particle is present in the environmentally compatible defoamer in an amount in the range of from about 10% to about 20% by weight.

Optionally, the cement composition of the present invention may comprise a lost circulation material. The lost circulation material may be any suitable material that minimizes the loss of fluid circulation into fractures and/or permeable zones of the formation. Lost circulation materials typically comprise a variety of materials, which may include, but are not limited to, asphaltenes, ground coal, cellulosic materials, plastic materials, and the like. The lost circulation materials may be provided in particulate form. One of ordinary skill in the art, with the benefit of this disclosure, will recognize the appropriate amount of lost circulation material for a chosen application.

Optionally, other additional additives may be added to the cement compositions of the present invention as deemed appropriate by one skilled in the art with the benefit of this disclosure. Examples of such additives include, inter alia, fly ash, silica compounds, fluid loss control additives, dispersants, accelerators, retarders, salts, mica, sand, fibers, formation conditioning agents, fumed silica, bentonite, microspheres, weighting materials, and the like. Examples of suitable fluid loss control additives include those that are commercially available from Halliburton Energy Services, Inc., of Duncan, Okla., under the trade names LATEX 2000™, HALAD®9, HALAD®200, HALAD®344, HALAD®413, and HALAD®600. Examples of suitable dispersants include those that are commercially available from Halliburton Energy Services, Inc., of Duncan, Okla., under the trade names CFR®2L and CFR®3L. An example of a suitable silica compound is a silica flour commercially available from Halliburton Energy Services, Inc., of Duncan, Okla., under the trade name SSA-1. An example of a suitable fly ash is an ASTM class F fly ash that is commercially available from Halliburton Energy Services of Dallas, Tex., under the trade name POZMIX®A. Examples of suitable retarders include those that are commercially available from Halliburton Energy Services, Inc., of Duncan, Okla., under the trade names SCR-500™, HR®12 and HR®6L.

An example of an environmentally compatible defoamer of the present invention comprises 79% 1-octanol, 20% PETROFREE™ LV, and 1% ENVIROGEM® AE01 by weight. Another example of an environmentally compatible defoamer of the present invention comprises 50% 1-octanol, 40% PETROFREE™ LV; and 10% ENVIROGEM® AE02 by weight. Another example of an environmentally compatible defoamer of the present invention comprises 40% 1-hexanol, 40% PETROFREE™ LV, 15% hydrophobically-modified silica, and 5% ENVIROGEM® AE01 by weight. Another example of an environmentally compatible defoamer of the present invention comprises 59% 1-octanol, 40% PETROFREE™ LV, and 1% ENVIROGEM® AE01 by weight.

An example of a method of the present invention is a method of cementing in a subterranean formation, comprising: providing a cement composition that comprises water, hydraulic cement, and a defoamer, the defoamer comprising at least one of a defoaming hydrocarbon base fluid, a surfactant, a hydrophobic particle, or a mixture thereof; placing the cement composition in at least a portion of a subterranean formation; and permitting the cement composition to set therein.

Another example of a method of the present invention is a method of cementing in a subterranean formation, comprising: providing a cement composition that comprises water, hydraulic cement, and a defoamer, the defoamer comprising a defoaming hydrocarbon base fluid and a surfactant; placing the cement composition in at least a portion of a subterranean formation; and permitting the cement composition to set therein.

Another example of a method of the present invention is a method of reducing foam generation in a cement composition, comprising adding a defoamer to a cement composition, the defoamer comprising at least one of a defoaming hydrocarbon base fluid, a surfactant, a hydrophobic particle, or a mixture thereof.

Another example of a method of the present invention is a method of reducing foam generation in a cement composition, comprising adding a defoamer to a cement composition, the defoamer comprising a defoaming hydrocarbon base fluid and a surfactant.

To facilitate a better understanding of the present invention, the following examples of preferred embodiments are given. In no way should the following examples be read to limit, or to define, the scope of the invention.

EXAMPLE 1

Sample cement compositions were prepared by mixing a base cement slurry with an environmentally compatible defoamer of the present invention in accordance with the following procedure. The base cement slurry was prepared in accordance with API Specification 10B by mixing TXI Class H cement with 42% saturated salt water bwoc. The design density of each sample composition (e.g., the density that each sample composition would be expected to have if the sample composition entrained no air) was 16.91 pounds per gallon.

Sample Compositions Nos. 1 and 2 consisted of the base cement slurry with no defoamer added.

Sample Composition No. 3 was prepared by mixing the base cement slurry with 0.25% bwoc of a defoamer of the present invention that comprised 1-octanol with 10% "ENVIROGEM® AE01" by weight of the defoamer.

Sample Composition No. 4 was prepared by mixing the base cement slurry with 0.25% bwoc of a defoamer of the present invention that comprised 1-octanol with 20% "ENVIROGEM® AE02" by weight of the defoamer.

The results of the testing are set forth in the table below.

TABLE 1

| Sample Composition | Volume (cm³) | Mass (g) | Design Density (lb/gal) | Actual Density (g/cm³) | Actual Density (lb/gal) |
|---|---|---|---|---|---|
| Sample Composition No. 1 | 513.03 | 970.91 | 16.91 | 1.893 | 15.79 |
| Sample Composition No. 3 | 513.03 | 1019.80 | 16.91 | 1.988 | 16.59 |
| Sample Composition No. 2 | 206.21 | 366.04 | 16.91 | 1.775 | 14.81 |
| Sample Composition No. 4 | 206.47 | 396.16 | 16.91 | 1.919 | 16.01 |

The above example demonstrates, inter alia, that the cement compositions of the present invention comprising environmentally compatible defoamers are suitable for use in subterranean formations.

EXAMPLE 2

Sample cement compositions were prepared by mixing a base cement slurry with an environmentally compatible defoamer of the present invention in accordance with the following procedure. All sample cement compositions were prepared in accordance with API Specification 10B.

Sample Composition No. 5 comprised TXI Class H cement, mixed with 5.20 gallons of water per sack of cement, plus 0.80% HALAD®9 bwoc. The design density of this sample composition (e.g., the density that each sample composition would be expected to have if the sample composition entrained no air) was 15.64 pounds per gallon.

Sample Composition No. 6 comprised TXI Class H cement, mixed with 5.20 gallons of water per sack of cement, plus 0.80% HALAD®9 bwoc and 0.25% bwoc of an environmentally compatible defoamer of the present invention that comprised 81.2% 1-octanol by weight, 17.8% PETROFREE™ LV by weight, and 1% "ENVIROGEM® AE01" by weight. The design density of this sample composition was 15.64 pounds per gallon.

Sample Composition No. 7 comprised TXI Class H cement, mixed with 4.36 gallons of water per sack of cement, plus 37.2% sodium chloride by weight of the water, and 1.0% HR®12 bwoc. The design density of this sample composition was 16.8 pounds per gallon.

Sample Composition No. 8 comprised TXI Class H cement, mixed with 4.36 gallons of water per sack of cement, plus 37.2% sodium chloride by weight of the water, 1.0% HR®12 bwoc, and 0.25% bwoc of an environmentally compatible defoamer of the present invention that comprised 81.2% 1-octanol by weight, 17.8% PETROFREE™ LV by weight, and 1% "ENVIROGEM® AE01" by weight. The design density of this sample composition was 16.8 pounds per gallon.

Sample Composition No. 9 comprised TXI Class H cement, mixed with 2.63 gallons of water per sack of cement, plus 1.50 gallons of LATEX 2000™ per sack of cement, 0.14 gallons of STABILIZER 434B per sack of cement, and 0.04 gallons of CFR®2L per sack of cement. The design density of this sample composition was 16.5 pounds per gallon.

Sample Composition No. 10 comprised TXI Class H cement, mixed with 2.63 gallons of water per sack of cement, plus 1.50 gallons of LATEX 2000™ per sack of cement, 0.14 gallons of STABILIZER 434B per sack of cement, 0.04 gallons of CFR®2 L per sack of cement and 0.05 gallons of a defoamer of the present invention (comprising 81.2% 1-octanol by weight, 17.8% PETROFREE™ LV by weight, and 1% "ENVIROGEM® AE01" by weight) per sack of cement. The design density of this sample composition was 16.5 pounds per gallon.

Sample Composition No. 11 comprised TXI Class G cement, mixed with 29% water bwoc, 37.2% sodium chloride by weight of the water, 0.084 gallons of a water-soluble condensate polymer per sack of cement, 0.09 gallons of SCR 500™ per sack of cement, and 0.034 gallons of HALAD®200 per sack of cement. The design density of this sample composition was 17.54 pounds per gallon.

Sample Composition No. 12 comprised TXI Class G cement, mixed with 29% water bwoc, 37.2% sodium chloride by weight of the water, 0.084 gallons of a water-soluble condensate polymer per sack of cement, 0.09 gallons of SCR 500™ per sack of cement, 0.034 gallons of HALAD®200 per sack of cement, and 0.034 gallons of a defoamer of the present invention (comprising 81.2% 1-octanol by weight, 17.8% PETROFREE™ LV by weight, and 1% "ENVIROGEM® AE01" by weight) per sack of cement. The design density of this sample composition was 17.54 pounds per gallon.

Sample Composition No. 13 comprised TXI Class G cement, mixed with 42% water bwoc, 37.2% sodium chloride by weight of the water, 35% SSA-1 bwoc, 0.084 gallons of CFR®3L per sack of cement, 0.09 gallons of HR®6L per sack of cement, and 0.62 gallons of HALAD®600 per sack of cement. The design density of this sample composition was 16.57 pounds per gallon.

Sample Composition No. 14 comprised TXI Class G cement, mixed with 42% water bwoc, 37.2% sodium chloride by weight of the water, 35% SSA-1 bwoc, 0.084 gallons of CFR®3L per sack of cement, 0.09 gallons of HR®6L per sack of cement, 0.62 gallons of HALAD®600 per sack of cement, and 0.25% bwoc of a defoamer of the present invention (comprising 81.2% 1-octanol by weight, 17.8% PETROFREE™ LV by weight, and 1% "ENVIROGEM® AE01" by weight). The design density of this sample composition was 16.57 pounds per gallon.

Sample Composition No. 15 comprised TXI Class G cement, mixed with 29% water bwoc, 37.2% sodium chloride by weight of the water, 0.146 gallons of MICROBLOCK per sack of cement, 0.084 gallons of CFR®3L per sack of cement, and 0.09 gallons of a water-soluble grafted polymer per sack of cement. The design density of this sample composition was 17.40 pounds per gallon.

Sample Composition No. 16 comprised TXI Class G cement, mixed with 29% water bwoc, 37.2% sodium chloride by weight of the water, 0.146 gallons of MICROBLOCK per sack of cement, 0.084 gallons of CFR®3L per sack of cement, 0.09 gallons of a water-soluble grafted polymer per sack of cement, and 0.034 gallons of a defoamer of the present invention (comprising 81.2% 1-octanol by weight, 17.8% PETROFREE™ LV by weight, and 1% "ENVIROGEM® AE01" by weight). The design density of this sample composition was 17.40 pounds per gallon.

The results of the testing are set forth in the table below.

TABLE 2

| Sample Composition | Design Density (lb/gal) | Actual Density (lb/gal) |
| --- | --- | --- |
| Sample Composition No. 5 | 15.64 | 15.06 |
| Sample Composition No. 6 | 15.64 | 15.5 |
| Sample Composition No. 7 | 16.8 | 14.86 |
| Sample Composition No. 8 | 16.8 | 16.47 |
| Sample Composition No. 9 | 16.5 | 12.22 |
| Sample Composition No. 10 | 16.5 | 14.26 |
| Sample Composition No. 11 | 17.54 | 16.55 |
| Sample Composition No. 12 | 17.54 | 17.44 |
| Sample Composition No. 13 | 16.57 | 13.46 |
| Sample Composition No. 14 | 16.57 | 16.54 |
| Sample Composition No. 15 | 17.4 | 16.56 |
| Sample Composition No. 16 | 17.4 | 17.31 |

The above example demonstrates, inter alia, that the cement compositions of the present invention comprising environmentally compatible defoamers are suitable for use in subterranean formations.

EXAMPLE 3

A sample foam was prepared by adding 1 mL of HC-2 (a foaming betaine that is commercially available from Halliburton Energy Services, Inc. of Duncan, Okla.) to 500 mL of water. In individual experiments, the sample foam was contacted with one of a variety of defoamers to compare the defoaming capability of each defoamer. More particularly, the mixture of water and HC-2 was mixed in a Waring blender at 5,000 rpm until foam filled the 1,000 mL blender jar. Each defoamer was added while mixing continued at 5,000 rpm.

The following numerals were used to characterize the results of each individual test:

a. A "4" referred to a result in which the addition of a given amount of a given defoamer had little to no effect in breaking the foam.
b. A "3" referred to a result in which the addition of a given amount of a given defoamer slowly, or partially, broke the foam. In certain instances, the addition of the defoamer prevented the foam from propagating further, and caused the disappearance of about one-third of the foam in less than one minute.
c. A "2" referred to a result in which the addition of a given amount of a given defoamer broke the majority of the foam. In certain instances, the addition of the defoamer prevented the foam from propagating further, and caused the majority of the foam to rapidly disappear.
d. A "1" referred to a result in which the addition of a given amount of a given defoamer entirely broke the foam. In certain instances, the breaking of the entirety of the foam was accompanied by an audible difference in the sound made by the mixer.

In Tables 3 and 4, the abbreviation "N.D." means that results for the referenced amount of the particular defoamer were not determined.

TABLE 3

| Defoamer Composition (all %'s are weight %) | Volume of Defoamer Added | | | |
| --- | --- | --- | --- | --- |
| | Few Drops | 1 mL | 2 mL | 10 mL |
| DAIR 3000 L | 2 | 1 | N.D. | N.D. |
| NF-6 | 3 | 1 to 2 | 1 | N.D. |
| 99% octanol, 1% ENVIROGEM AE01 | 2 | 1 | N.D. | N.D. |
| 95% octanol, 5% ENVIROGEM AE01 | 2 | 1 | N.D. | N.D. |
| 90% octanol, 10% ENVIROGEM AE01 | 2 | 1 | N.D. | N.D. |
| 80% octanol, 20% ENVIROGEM AE01 | 2 | 1 | N.D. | N.D. |
| 99% hexanol, 1% ENVIROGEM AE01 | N.D. | 1 | N.D. | N.D. |
| 90% hexanol, 10% ENVIROGEM AE01 | N.D. | 1 | N.D. | N.D. |
| 90% of a 1:1 mixture of hexanol and ethylene, glycol, 10% ENVIROGEM AE01 | N.D. | 2 | 1 | N.D. |
| 80% butanol, 20% ENVIROGEM AE01 | N.D. | 2 | 2 | 1 |
| 70% butanol, 15% ENVIROGEM AE01, 15% hydrophobically-modified silica | N.D. | 2 | N.D. | 1 |
| 90% butanol, 10% RHODOCLEAN HP | N.D. | 2 | 2 | 1 |
| 70% butanol, 20% AE01, 10% aluminum stearate | N.D. | 2 | 2 | 1 |
| 90% internal olefin, 10% ENVIROGEM AE01 | N.D. | 4 | 4 | 3 |
| 70% internal olefin, 30% ENVIROGEM AE01 | N.D. | 4 | 3 | 3 |
| 60% internal olefin, 30% ENVIROGEM AE01, 10% SSA-1 silica flour | N.D. | 4 | 3 | 3 |
| 87% internal olefin, 10% ENVIROGEM AE01, 3% hydrophobically-modified silica | N.D. | 3 | 2 to 3 | 1 |
| 70% internal olefin, 20% ENVIROGEM AE01, 10% hydrophobically-modified silica | N.D. | 1 to 2 | N.D. | N.D. |
| 70% internal olefin, 20% ENVIROGEM AE01, 10% graphite | N.D. | 2 to 3 | 2 | 1 |
| 55% internal olefin, 30% ENVIROGEM AE01, 15% graphite | N.D. | 2 | 2 | 1 |
| 70% internal olefin, 20% ENVIROGEM AE01, 10% aluminum stearate | N.D. | 2 | 2 | 1 |
| 40% internal olefin, 40% ENVIROGEM AE01, 20% aluminum stearate | N.D. | 2 | 2 | 1 |
| 84% ethylene glycol, 10% ENVIROGEM AE01, 6% hydrophobically-modified silica | N.D. | 4 | 4 | 3 |

TABLE 4

| Defoamer Composition (all %'s are weight %) | Volume of Defoamer Added | | | |
| --- | --- | --- | --- | --- |
| | Few Drops | 1 mL | 2 mL | 10 mL |
| RHODOCLEAN EFC | N.D. | 4 | N.D. | N.D. |
| RHODOCLEAN HP | N.D. | 2 | 1 | N.D. |
| RHODOCLEAN MSC | N.D. | 4 | N.D. | N.D. |
| Alkamide DC212 | N.D. | 4 | N.D. | N.D. |
| Alkamide 340D | N.D. | 4 | N.D. | N.D. |
| 1-decanol | N.D. | 2 | N.D. | N.D. |
| 1-octanol | 2 | 1 | N.D. | N.D. |
| Isopropanol | N.D. | N.D. | N.D. | 4 |
| 1-butanol | 2 | 2 | 2 | 1 |
| Internal olefin | N.D. | N.D. | N.D. | 2 |
| Ethylene glycol | N.D. | N.D. | N.D. | 4 |
| 2-butanol | N.D. | 3 | N.D. | N.D. |
| Sand | N.D. | 4 | N.D. | N.D. |
| Hydrophobically-modified silica | N.D. | 2 to 3 | N.D. | N.D. |

The above example demonstrates, inter alia, that the environmentally compatible defoamers of the present invention, comprising at least one of a defoaming hydrocarbon base fluid, a surfactant, hydrophobic particles, or a mixture thereof, may provide desirable defoaming capability.

Therefore, the present invention is well adapted to carry out the objects and attain the ends and advantages mentioned as well as those that are inherent therein. While the invention has been depicted and described by reference to certain embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are only, and are not exhaustive of the scope of the invention. Consequently, the invention is intended to be limited only by the spirit and scope of the appended claims, giving full cognizance to equivalents in all respects.

What is claimed is:

1. A method of reducing foam generation in a cement composition, comprising including a defoamer in the cement composition, the defoamer comprising a defoaming hydrocarbon base fluid and a non-ionic surfactant present in the defoamer in an amount in the range of from about 0.01% to about 10% by weight of the defoamer, wherein the defoaming hydrocarbon base fluid comprises 1-hexanol; wherein the defoamer further comprises ethylene glycol mixed with the 1-hexanol; wherein the ethylene glycol is present in the mixture of the ethylene glycol and the 1-hexanol in an amount in the range of from about 10% to about 50% by weight of the mixture.

2. The method of claim 1 wherein the defoamer further comprises a hydrophobic particle.

3. The method of claim 2 wherein the hydrophobic particle is present in the defoamer in an amount in the range of from about 10% to about 20% by weight of the defoamer.

4. The method of 1 wherein the defoaming hydrocarbon base fluid comprises an internal olefin or a straight-chain n-alcohol.

5. A method of reducing foam generation in a cement composition, comprising including a defoamer in the cement composition, the defoamer comprising a defoaming hydrocarbon base fluid and a non-ionic surfactant present in the defoamer in an amount in the range of from about 0.01% to about 10% by weight of the defoamer, wherein the defoaming hydrocarbon base fluid comprises 1-hexanol; wherein the defoamer further comprises a cosolvent mixed with the 1-hexanol; wherein the co-solvent comprises ethylene glycol or an esterbased fluid that comprises 2-ethylhexanol; and wherein the 1-hexanol is present in the mixture of 1-hexanol and co-solvent in an amount in the range of from about 10% to about 80% by weight of the mixture.

6. The method of claim 1 wherein the defoamer is added to a water component of the cement composition prior to combination of the water component with a hydraulic cement.

7. The method of claim 1 wherein the defoaming hydrocarbon base fluid comprises a simple alcohol.

* * * * *